(12) United States Patent
Casillas et al.

(10) Patent No.: US 11,271,918 B1
(45) Date of Patent: *Mar. 8, 2022

(54) QUICK-LOGON FOR COMPUTING DEVICE

(71) Applicant: United Services Automobile Association (USAA), San Antonio, TX (US)

(72) Inventors: Debra Casillas, Helotes, TX (US); Richard Andrew Davey, San Antonio, TX (US); Michael Frank Morris, San Antonio, TX (US); Maland Keith Mortensen, San Antonio, TX (US); John David Row, San Antonio, TX (US); Thomas Buckingham, Fair Oaks Ranch, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/853,541

(22) Filed: Apr. 20, 2020

Related U.S. Application Data

(63) Continuation of application No. 16/219,451, filed on Dec. 13, 2018, now Pat. No. 10,630,670, which is a continuation of application No. 15/908,446, filed on Feb. 28, 2018, now Pat. No. 10,187,371, which is a continuation of application No. 14/992,796, filed on Jan. 11, 2016, now Pat. No. 9,917,825, which is a continuation of application No. 14/301,856, filed on
(Continued)

(51) Int. Cl.
*H04L 29/06* (2006.01)
*G06F 21/33* (2013.01)
*G06F 21/44* (2013.01)
*G06F 21/31* (2013.01)

(52) U.S. Cl.
CPC ............ *H04L 63/08* (2013.01); *G06F 21/316* (2013.01); *G06F 21/335* (2013.01); *G06F 21/44* (2013.01); *H04L 63/083* (2013.01); *H04L 63/145* (2013.01); *H04L 63/1408* (2013.01); *G06F 2221/2117* (2013.01); *G06F 2221/2129* (2013.01); *H04L 63/0861* (2013.01); *H04L 2463/082* (2013.01)

(58) Field of Classification Search
CPC ........ H04L 63/145; H04L 3/08; H04L 63/083
USPC .......................................................... 726/7
See application file for complete search history.

(56) References Cited

U.S. PATENT DOCUMENTS

| | | |
|---|---|---|
| 4,998,279 A | 3/1991 | Weiss |
| 9,237,146 B1 | 1/2016 | Casillas et al. |

(Continued)

OTHER PUBLICATIONS

U.S. Appl. No. 16/355,099, filed Mar. 15, 2019 and titled "Quick-Logon for Computing Device."
(Continued)

*Primary Examiner* — Evans Desrosiers
(74) *Attorney, Agent, or Firm* — Perkins Coie LLP

(57) ABSTRACT

Methods and systems for verifying a user's identity on a computing device using two-factor authentication are described. More particularly, the system utilizes a personal identification number input by a user, together with one or more of a secure browsing feature, a device fingerprint, and a token generator to authenticate the user on the computer.

20 Claims, 9 Drawing Sheets

Related U.S. Application Data

Jun. 11, 2014, now Pat. No. 9,237,146, which is a continuation of application No. 13/752,211, filed on Jan. 28, 2013, now abandoned.

(60) Provisional application No. 61/591,186, filed on Jan. 26, 2012.

(56) References Cited

U.S. PATENT DOCUMENTS

| | | | |
|---|---|---|---|
| 9,917,825 | B1 | 3/2018 | Casillas et al. |
| 10,187,371 | B1 | 1/2019 | Casillas et al. |
| 10,282,531 | B1 | 5/2019 | Davey et al. |
| 10,630,670 | B1 | 4/2020 | Davey et al. |
| 2002/0116642 | A1 | 8/2002 | Joshi et al. |
| 2007/0289002 | A1 | 12/2007 | van Der Horst et al. |
| 2008/0098464 | A1 | 4/2008 | Mizrah |
| 2009/0292927 | A1 | 11/2009 | Wenzel et al. |
| 2010/0058064 | A1 | 3/2010 | Kirovski et al. |
| 2010/0205448 | A1 | 8/2010 | Tarhan et al. |
| 2010/0293608 | A1 | 11/2010 | Schechter et al. |
| 2011/0004526 | A1 | 1/2011 | Hammad et al. |
| 2011/0247045 | A1* | 10/2011 | Rajagopal ............ H04L 63/102 726/1 |
| 2011/0247055 | A1 | 10/2011 | Guo et al. |
| 2012/0066749 | A1* | 3/2012 | Taugbol ................. G06F 21/40 726/6 |
| 2012/0137340 | A1 | 5/2012 | Jakobsson et al. |
| 2012/0144468 | A1 | 6/2012 | Pratt et al. |
| 2012/0148043 | A1 | 6/2012 | Tofighbakhsh |
| 2012/0173311 | A1 | 7/2012 | Chang et al. |
| 2012/0174212 | A1 | 7/2012 | Dart et al. |
| 2012/0254963 | A1 | 10/2012 | Sancheti et al. |
| 2013/0097701 | A1 | 4/2013 | Moyle et al. |
| 2013/0110676 | A1* | 5/2013 | Kobres ................. G06Q 20/20 705/26.41 |
| 2013/0145420 | A1 | 6/2013 | Ting et al. |
| 2013/0179692 | A1 | 7/2013 | Tolba et al. |

OTHER PUBLICATIONS

U.S. Appl. No. 16/355,099, filed Mar. 15, 2019, Quick-Logon for Computing Device.
U.S. Appl. No. 16/219,451, now U.S. Pat. No. 10,630,670, filed Dec. 13, 2018, Apr. 21, 2020, Quick-Logon for Computing Device.
U.S. Appl. No. 15/908,446, now U.S. Pat. No. 10,187,371, filed Feb. 28, 2018, Jan. 22, 2019, Quick-Logon for Computing Device.
U.S. Appl. No. 15/442,826, now U.S. Pat. No. 10,282,531, filed Feb. 27, 2017, May 7, 2019, Quick-Logon for Computing Device.
U.S. Appl. No. 14/992,796, now U.S. Pat. No. 9,917,825, filed Jan. 11, 2016, Mar. 13, 2018, Quick-Logon for Computing Device.
U.S. Appl. No. 14/301,856, now U.S. Pat. No. 9,237,146, filed Jun. 11, 2014, Jan. 12, 2016, Quick-Logon for Computing Device.
U.S. Appl. No. 13/752,211, filed Jan. 28, 2013, Quick-Logon for Computing Device.
U.S. Appl. No. 61/591,186, filed Jan. 26, 2012, Quick-Logon for Personal Computer.

* cited by examiner

QUICK-LOGON FOR COMPUTING DEVICE

CROSS-REFERENCE TO RELATED APPLICATION

This application is a continuation of U.S. patent application Ser. No. 16/219,451, filed on Dec. 13, 2018, entitled "QUICK-LOGON FOR COMPUTING DEVICE," now U.S. patent Ser. No. 10/630,670, which is a continuation of U.S. patent application Ser. No. 15/908,446, filed on Feb. 28, 2018, entitled "QUICK-LOGON FOR COMPUTING DEVICE," now U.S. Pat. No. 10,187,371, which is a continuation of U.S. patent application Ser. No. 14/992,796, filed on Jan. 11, 2016, entitled "QUICK-LOGON FOR COMPUTING DEVICE," now U.S. Pat. No. 9,917,825, which is a continuation of U.S. patent application Ser. No. 14/301,856, filed on Jun. 11, 2014, entitled "QUICK-LOGON FOR COMPUTING DEVICE," now U.S. Pat. No. 9,237,146, which is a continuation of U.S. patent application Ser. No. 13/752,211, filed Jan. 28, 2013, entitled "QUICK-LOGON FOR COMPUTING DEVICE," which claims priority from Provisional Application No. 61/591,186, filed on Jan. 26, 2012, each of which are incorporated herein by reference in their entireties for all purposes. This application is also related to U.S. patent application Ser. No. 15/442,826, filed on Feb. 27, 2017, entitled QUICK-LOGON FOR COMPUTING DEVICE," now U.S. Pat. No. 10,282,531, which is incorporated herein by reference in its entirety for all purposes.

TECHNICAL FIELD

Various embodiments of the present invention generally relate to identity authentication. More specifically, various embodiments of the present application relate to methods and systems for verifying identity on a personal computer using two-factor authentication.

BACKGROUND

The protection and security of customer information is vital from an organization's perspective, not only to comply with applicable laws, but to earn and keep their customer's trust. Enhanced security often comes at the cost of convenience for the user, such as by requiring the user to answer additional security questions or to provide a code generated from a token generator. Various methods are used in authenticating a user attempting to access an account. Security analysts have identified three authentication factors that can be used in making a positive identification: ownership, knowledge, and inherence. Elements used to verify the first factor, ownership, may include a phone, a security token, or a software token. Elements used to verify the knowledge factor may include a password, username, personal identification number (PIN) or answers to security questions. Elements used to verify the inherence factor may include biometric data.

Verifying two of the factors, "two-factor authentication", is commonly used to authenticate a user. For example, many applications on mobile devices require the user to enter a PIN, satisfying the knowledge factor, on a particular mobile device, satisfying the ownership factor. In some mobile devices, the ownership factor is generally assumed to be satisfied because many mobile devices such as smartphones are particular to one person. Thus an impersonator would be required not only to have the mobile device, but also to know the PIN in order to access the application. This enables users to simply input a PIN into an application on a mobile device to be authenticated.

Personal computers (computing devices) pose additional complexities in authenticating users. Computing devices are commonly used by more than one person. Thus, it is not safe to assume that the identity of the computing device satisfies the ownership factor. Additionally, computing devices have been more easily compromised than other devices. Current solutions increase security, but are often inconvenient for users. For example, one solution includes providing users with some type of token, and requiring the user to prove that the user has the token such as by typing in a one-time code generated by the token, in combination with a username/password/PIN. Other solutions focus on the knowledge factor such as by requiring the user to answer additional security questions.

SUMMARY

Disclosed herein are methods and systems for verifying a user's identity on a personal computer using two-factor authentication. More particularly, the system utilizes a personal identification number input by a user, together with one or more of a secure browsing feature, a device fingerprint, and a token generator to authenticate the user on the computer.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
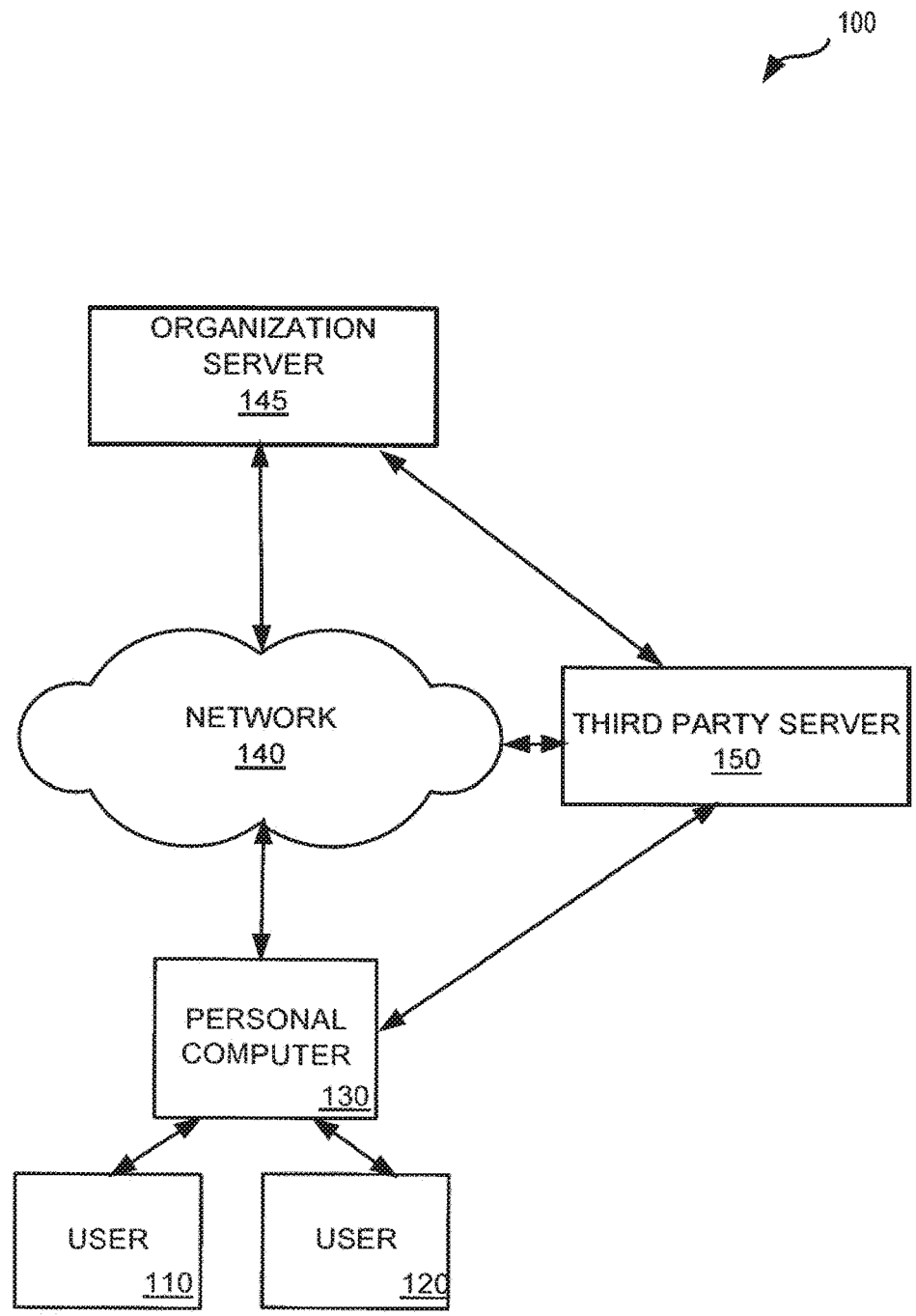
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to verifying a user's identity on a computing device (e.g. mobile device, computing device, tablet, etc.) without requiring the user to enter more than one piece of information (e.g. a PIN, password, security question, etc.). More specifically, quick-logon for computing device of various exemplary embodiments utilizes a PIN input by a user, together with a transparent verification of one or more characteristics related to the user and/or the computing device (e.g. one or more of a secure browsing feature, a device fingerprint, a token, a behavioral characteristic, a biometric characteristic, etc.). According to some embodiments, the quick-logon system allows a registered user on a registered computing device to be verified using multiple factor authentication, where the only required user input is a PIN.

In one example, the system allows the user to enter a PIN and then in response to proper entry of the PIN, the system performs a multi-step authentication process by which the certain characteristics of the computing device and/or the user are verified in order to achieve a confidence level that the user is who he or she says he is. When the confidence level exceeds a threshold confidence level, the system allows the user to access to the system to which the user is seeking access.

For example, in response to correct entry of the PIN, the system may verify that a particular secure browser (e.g. a browser with malware detection and mitigation technology) is installed on the user's device. If such a secure browser is installed on the user's device, the system may allow access or seek to develop a higher level of confidence in the user's identity.

For instance, the system may verify that the device fingerprint matches the device fingerprint that the browser was initially installed upon. If the device fingerprint does not match the device fingerprint of the device upon which the browser was initially installed, the system may determine to deny access because it would appear that the browser was moved to a different machine and this may be a sign that an unauthorized user is attempting to circumvent the system by moving the secure browser to another device.

In another example, the system may monitor user's behavior as reflected by the user's input/output characteristic (e.g. key strokes, mouse movements, browsing behavior, etc.) If the user's behavior matches, within a particular degree of tolerance, expected behavior within a user profile, the system may determine to allow access because the user's identity is verified. However, if the behavior characteristics do not match the user's profile, the system may deny access because it may appear that the user's PIN and device were hijacked by another unauthorized user.

In another example, they system may transparently monitor a user's biometric characteristics (e.g. fingerprint, voice, retina, etc.) and verify the user's identity through comparing the monitored characteristic(s) to those stored in a user profile.

The preceding examples were provided for exemplary purposes only. It should be understood that any or all of the preceding characteristics could be used to achieve confidence in the user's identity. Moreover, the recited order was provided for exemplary purposes only and it should be understood that various orders and combination could be used to verify identity depending on strict or lax the system administrators wish the security policy to be.

In order for a user to utilize the quick-logon system, the user must register on a computing device. Registration allows the organization to gather information and install processes used to verify the user's identity during quick-logon. The registration process involves exchanging communication with the computing device (client) and the organization server, and in some instances, one or both of the computing device and organization server may exchange communication with a third party server. Prior to registration, the user's identity is verified to some threshold. For example the user may be required to logon to the system using traditional methods such as providing a username and password, or the user may be required to answer security questions. In many instances, additional data is required, such as a token, a PIN, or answers to a security question. After the user's identity is verified to a certain level, the user must grant permission to install the quick-logon system on the computing device. The quick-logon installation process involves creating a device fingerprint that identifies the computing device and can be used as an identity indicator for the user. The device fingerprint may be stored on the organization server and associated with the user. Next, the server may provide a client-side executable to install a secure browsing solution on the computing device. The organization may then request an activation code for a token generator from a third party, which activation code the organization then sends to the computing device. In return for the activation code from the computing device, the third party may provide the computing device with a serial number and a shared secret key for the token generator. Next, the organization may associate the token generator with the user using a user identification number for example. The token generator may then be installed on the computing device. During the registration process, the shared secret key associated with the token generator may be embedded on the computing device, and encrypted. The token generator is used during quick-logon to generate a one-time code. In some embodiments, the token generator may be removed after the user terminates a session or after the quick-logon process is complete and re-installed when the user launches quick-logon, or it may remain on the computing device. Prior to installation, the user may receive information about what to expect during the installation. Additionally, the user may receive dialogue boxes during installation, informing the user of the progress and activities.

Further, the user may be required to enter additional data that can be used to verify the user's identity. For instance, the user may have to input various biometric data. In another example the system may transparently monitor to the user's behavior (e.g. keystroke patterns, browsing history, etc.) to determine a behavior profile for the user.

In accordance with some embodiments of the invention, to use the quick-logon system, the user accesses the organization website. Detecting that the computing device is registered, the user is directed to a PIN input page. After the user inputs their PIN, a number of validations take place before the user is granted access. The validations may include determining that secure browsing is enabled (this may be done prior to quick-logon), verifying the stored device fingerprint with the accessing computing device's device configuration, validating the PIN, and validating the one-time code generated by the token generator. Other validations may take place as the system is not limited to the aforementioned techniques. Thus, the user may be validated using two-factor authentication on a computing device.

In some scenarios, multiple users access the same computing device. In accordance with some embodiments of the present invention, the system provides for multiple user situations by allowing multiple users to register on the same computing device. For users having the same profile or logon to the computing device, each user is provided with a separate token generator requiring a separate shared secret key. In such circumstances, the device fingerprint does not need to be recreated, rather it is associated with the second user, and the secure browser does not need to be re-installed. However, if the users are logged onto the computing device with different profiles, then the multiple users will proceed with a typical installation process as if no other user has been registered on the computing device.

In the following description, embodiments include a token generator as an optional feature in verifying the user's identification. However, the functionality of the token generator may be replaced with or used in addition to a secure or obfuscated key that represents the computer and/or the user. During installation, the organization server may install a secure or obfuscated key or certificate on the computing device. This key would be static, unlike the codes that are generated from the token generator. During quick-logon, the key may be verified by the organization server. The key may be associated on the server side with the user such as with a user identification number. Or the key may be associated with the personal computer. Thus, the key may be per user or per machine. The key may be stored in any manner on the personal computer known to those skilled in the art, such as in a secure key ring.

For additional security during the registration and quick-logon process, during the exchange of information between the personal computer and the organization server, relevant data (i.e., data that will be used in the authentication process) may be combined or padded with irrelevant data. For example, while collecting the personal computer's computer name, the organization server may request several irrelevant files. Additionally, the data may be stored with irrelevant data. Thus, transmitted and stored information may be more secure because potential hackers will be forced to determine the relevant information, resulting in a more secure overall authentication process.

Hence, the methods and systems described provide for a quick-logon experience for the user on a computing device, while preserving, and in many cases, enhancing security. Because the authentication is tied to a particular computing device, embodiments of the present invention are best utilized on computing devices that are used multiple times by a user to access accounts, such as a computer used at home or at work.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

FIG. 1 illustrates an example of an operating environment 100 in which some embodiments of the present invention may be utilized. The embodiments of the present invention illustrated in FIG. 1 allow user interaction between user 110 and/or user 120 with a personal computer (computing device) 130. User 110 and user 120 may be users, customers, or members of the organization utilizing personal computer 130. In some embodiments, order to register for quick-logon, the user has administrative access to the computer. Although only two users are shown, more users may utilize computing device 130 in accordance with various embodiments of the invention. Computing device 130 can run one or more clients that allow a user to interact with organization server 145 and third party server 150 through network 140. Such clients can be webpages and/or custom applications and may provide access to organization services such as bank processing systems.

As illustrated in FIG. 1, network 140 can be communicably coupled to computing device 130, third party server 150, and organization server 145. Organization server 145, third party server 150 and personal computer 130 may exchange communication via network 140. In some embodiments, communication channels between computing device 130, third party server 150, and organization server 145 are encrypted using any method known in the art. In some examples, the information exchanged is also encrypted using any method known in the art.

Computing device 130 may be any computer connected to network 140. For example, computing device 130 may be a desktop computer, netbook, tablet computer (a portable computer having a touch interface), or an Internet-enabled television device, etc. In some embodiments, computing device 130 may be a mobile device such as a cellular phone, smart phone (a smart phone being a cellular phone that has capabilities and features such as, but not limited to, internet access, a full keyboard, email access, Wi-Fi connection capabilities, BLUETOOTH connectivity, or any other functionality of a computer), or a laptop computer possibly with a wireless connection (such as an 802.11a/b/g connection or mobile broadband connection, such as via a 3G or 4G wireless network). Personal computer 130 may be shared among a small number of users or personal computer 130 may be shared among many users. For example, personal computer 130 may be shared with family members in a household, or personal computer 130 may be shared by co-workers in a work environment such as by deployed navy members on a ship.

Organization server 145 may be the server of an organization that includes one or more membership organizations, banks, credit unions, or other financial institutions. In accordance with embodiments of the present invention, organization server 145 can store information regarding users. In some embodiments, organization server 120 stores information including user identification number, membership identification number, phone number, address, etc. Organization server 145 may run various server side applications.

Third party server 150 may be any server that is external to the organization system. One or more third parties having one or more servers may be used to provide specific services, such as security services, to the organization and/or users of the organization. Third party server 150 may store information about users in the organization or services provided to particular users. For example, the third parties may provide secure browsing software, or third parties may provide a token generator, including a shared secret key required to generate the one-time code from the token generator.

In another example, third party server 150 may receive periodic communications from computing device 130 identifying the health of the computing device 130 with respect to certain predetermined criteria. For instance, if malware is detected on computing device 130 through the utilization of secure browsing technology, computing device 130 may notify third party server 150 of such malware detection. Third party server 150 may keep a log of all such malware detections. By keeping track of malware detection instances, third party server 150 shall maintain an understanding of the security health of computing device 130. If the relative health of computing device 130 drops below a predetermined threshold, mitigation measures may be commenced. For instance, third party server 150 may notify organization server 145 that computing device 130 no provides a secure environment, and quick-logon will be disabled for computing device 130. It should be noted that if third party server 150 is not utilized, then the preceding functions may be performed by organization server 145 itself.

Figure 2:
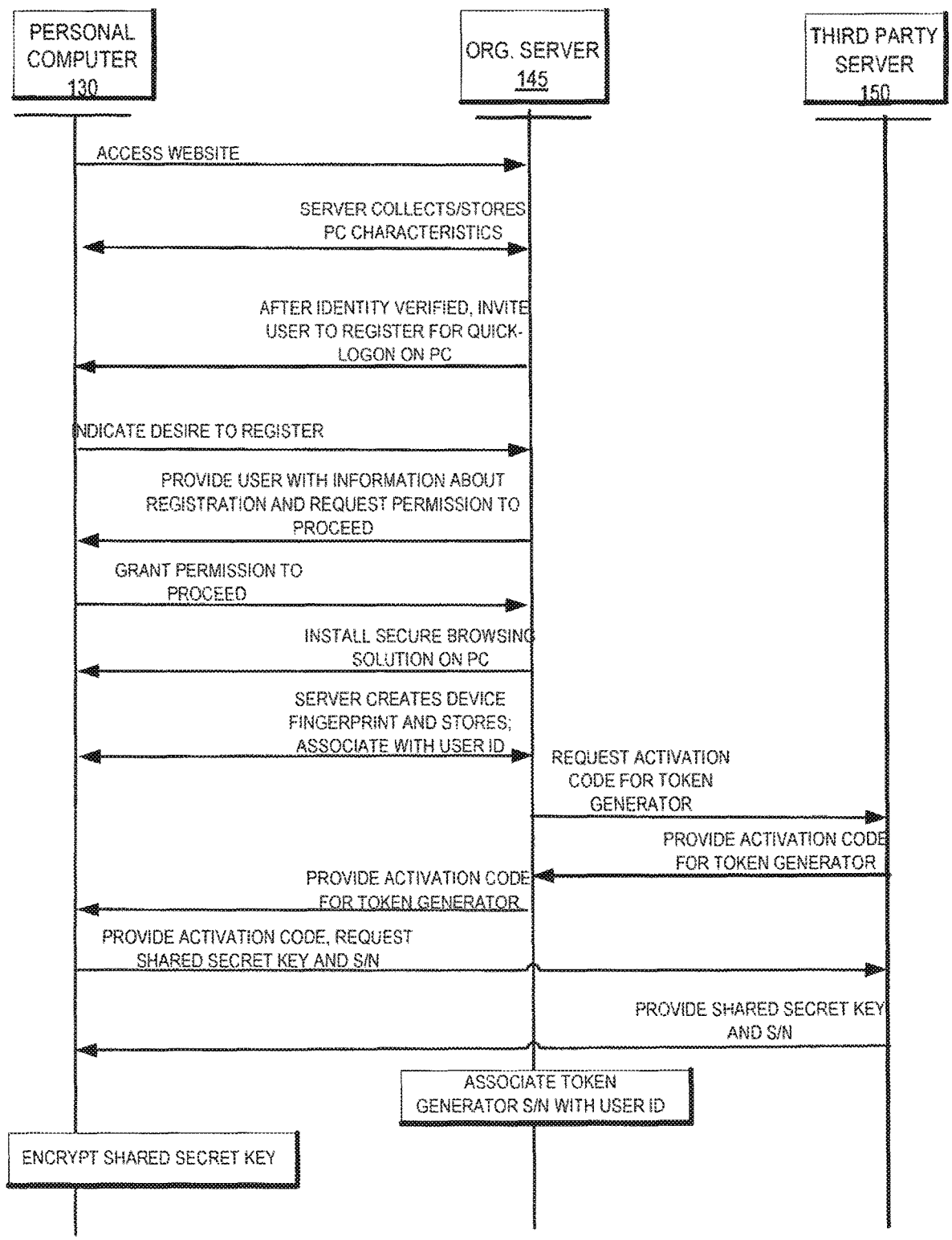
FIG. 2 illustrates a method of operation used in accordance with some embodiments of the present invention.

FIG. 2 illustrates an exemplary method of operation used in accordance with some embodiments of the present invention. The method illustrated in FIG. 2 may be used to register a user and computing device for quick-logon. In this example, a third party server 150 is included; however, in various embodiments, additional third parties may be used, or no third party may be used. Furthermore, for purposes of this example, computing device 130 has not been registered for quick-logon by this user or any other user. A user may interact with personal computer 130 to access an organization's website. By virtue of accessing the organization's website, the organization server 145 begins collecting information from computing device 130. The information may include any configuration information about the desktop environment including low level device configuration, hardware identification, clock speed, and the like. The server detects whether any user has registered this computing device for quick-logon, and whether secure browsing is enabled. Additionally, the server may detect whether the computing device has a software version that allows for the quick-logon installation. In cases where the computing device has been registered by a user, the user is directed to a quick-logon page. If however the computing device has not been registered, the user accesses the logon page of the organization and provides the necessary verification information to logon to the user's account. The verification information may include a username, password, PIN, security question, token, grid card, etc. Once the user has been verified to an acceptable level, the user may be presented with the option of registering for quick-logon in connection with the computing device. If the user expresses a desire to register, then the user is presented with a dialogue box or webpage providing information and/or instructions about the registration process. For example, the informational page may tell the user that certain software will be downloaded to the computing device. The user may also be presented with a page to create a PIN or input an existing PIN.

Additional permission may be requested after the user has an opportunity to read the informational page. If the user grants permission to continue, the quick-logon registration continues with a client-side executable that installs a secure browsing solution on the computing device. After installation, the secure browser ensures that certain activities are observed and that certain features are enabled or disabled during those activities. For example, in an effort to prevent fraud, if a user is logged into a banking website, the secure browser may disable certain recording features such as the snapshot feature. The secure browser may operate every time the browser is used, or only on trusted websites, depending on the type of secure browsing solution used. Different secure browsing solutions provide different abilities. For example, the secure browser may detect mal-ware, disinfect the browser upon installation and thereafter, and/or notify the organization server of any potential threats or weak links in security. The secure browsing solution is generally not user-specific.

During installation, a device fingerprint is created by running software on the computing device or installing an application. The information needed to create the device fingerprint, or the actual device fingerprint, is sent to the organization server and stored. The information recorded when the user initially accessed the organization website may be used. The device fingerprint is associated with the user in the organization server. A newly-created or pre-existing user identification/member identification number may be used to associate the user with the device fingerprint. Although the device fingerprint is not completely unique to the computing device, it can be used as one identity factor when authenticating the user. The device fingerprint provides assurance, at least to a certain threshold, that the system can recognize when portions of the system are compromised and access is attempted from a different computing device.

During installation, a token generator is associated with the user, and a shared secret key associated with the token generator is embedded and installed on the computing device. Each token generator has an activation code, a serial number, and a shared secret key associated with it. In some examples, the organization server requests an activation code for the token generator from a third party. The third party provides the activation code for the token generator to the organization server. The organization server then provides the activation code to the computing device. Upon receiving the activation code, the computing device provides the activation code to the third party and requests the shared secret key and the serial number for the token generator. The third party receives the activation code from the computing device and returns the shared secret key and serial number associated with the token generator to the computing device. The organization server associates the token generator serial number with the user, such as by associating the serial number with a user identification number. During the quick-logon process, the shared secret key, in combination with a time stamp, is provided to the token generator upon logon to generate a one time code. The one-time code is time-sensitive, meaning that the code provided by the token generator is different depending on the time stamp that the token generator is provided. The shared secret key is generally not provided to the organization server. During installation, the shared secret key is encrypted and stored on the computing device. In some embodiments, the shared secret key is encrypted with information including, but not limited to, the user's PIN. At this point, registration is complete and the user may be granted access to the account. In some embodiments, upon completion of registration or upon logout, if the token generator was installed during or after registration, the token generator is then removed from the computing device and reinstalled each time the user uses the quick-logon system, providing an extra layer of security.

Upon next logon on the computing device, the quick-logon page will be presented to the user, and the user will be prompted to provide a PIN to logon.

During registration, dialogue boxes may appear on the computing device to keep the user apprised of the installation process. At completion, the user may be presented with an option to allow for more secure logon when logging on from unregistered devices. For example, the user may be asked if the user prefers additional security such as a token or security questions when logging on from an unregistered computing device or other device. In some embodiments, the user may be provided the option of allowing read-only access when accessing the user's account from unregistered computing devices or if the user is unable to provide the additional security information.

In some embodiments, the organization server 145 detects during the initial access of the website that a user has already registered on the computing device. However, the accessing user may be a second user who has not yet registered, as the quick-logon system allows for multiple users to register on the same computing device. As discussed, if the server detects that the computing device is registered, the user is directed to the quick-logon page where the user may enter a PIN. The quick-logon page welcomes back the last quick-logon user and states "Welcome [User Name], please enter your PIN" or something similar. The page may also contain a selection that says, "Not User 110?" (or the like), or a selection such as "Not registered?" (or the like). If the user selects "Not User 110", a list of other users registered on that computing device may appear and the user may select appropriately. The user will then be directed to put in the PIN of the user selected. Alternatively, if the user selects the "Not registered" selection, the user is directed to the classic logon page. At this point the user may logon using the typical methods such as username and password, until the user is verified to an acceptable level. The user may be given the option to register for quick-logon using the methods described. Sometimes, the second user has the same profile as the first user or another user that has registered on the computing device. For example, the first and second users may have the same profile if the users share the same log on name and password to access the computing device. If the first and second users' profiles are the same, the registration process for registering the second user is substantially similar to registering a user on a computing device that no user has registered on. However, the device fingerprint will likely be the same as the device fingerprint created before for the first user and thus may not be recreated, but rather associated with the additional user. Also, the secure browsing solution will have been previously installed and thus will not be reinstalled. During installation, dialogue boxes may simply show statuses such as "Device Fingerprint Complete" instead of "Creating Device Fingerprint." A token generator will be assigned for the new user, and a unique shared secret key will be embedded on the computing device for that particular user. Thus, one computing device may have several embedded shared secret keys.

In some examples, the users have different profiles. This may occur if the first user logs onto the computing device under a different username. In this example, the server may not recognize that the first user has registered, and thus the second user is directed to the classic logon page. If the user is verified to the appropriate level and opts to register for quick-logon on the computing device, the installation process may be the same as if no other users have registered on the computing device (secure browsing may be installed, a device fingerprint will be created, and so on).

Figure 3:
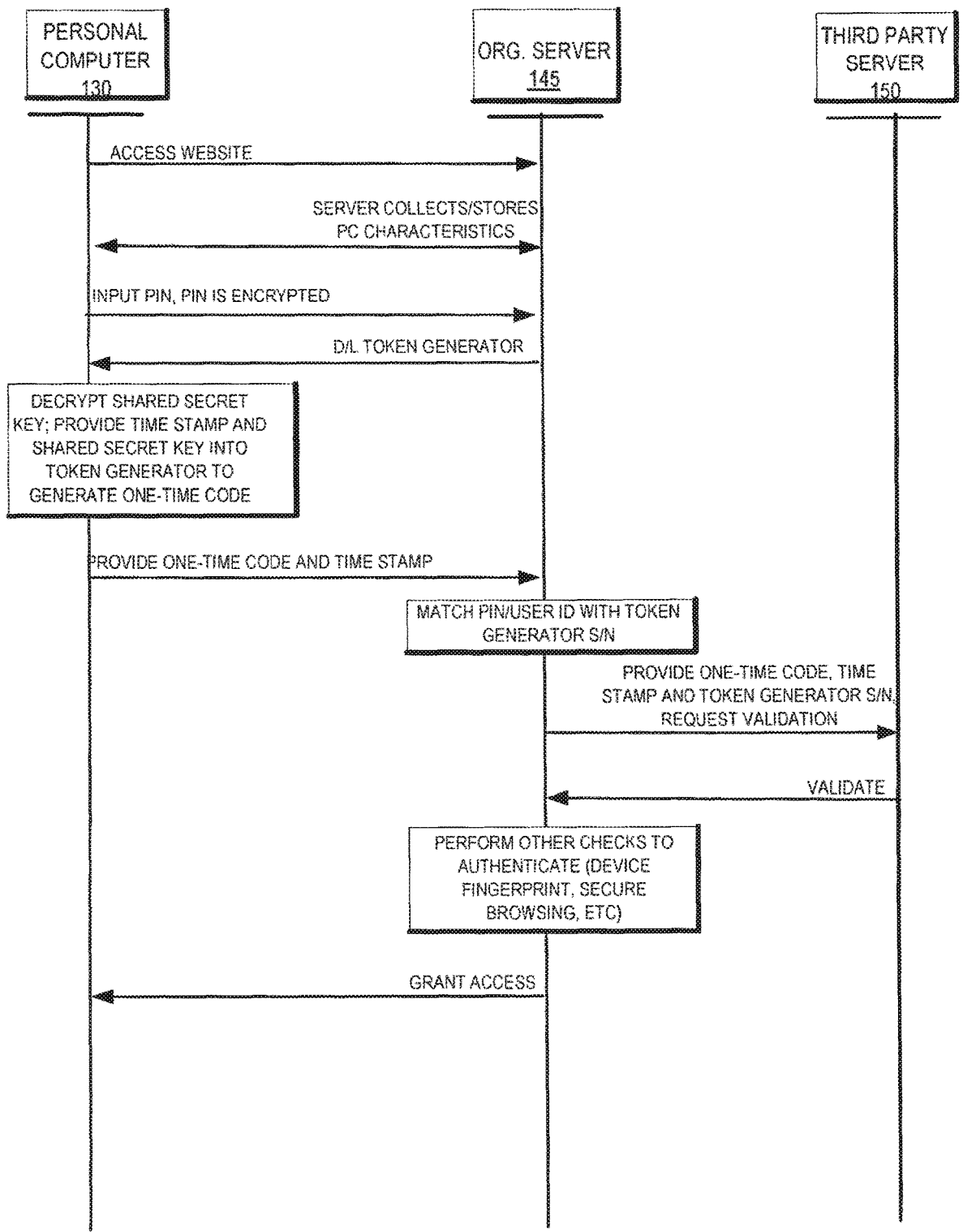
FIG. 3 illustrates a method of operation used in accordance with some embodiments of the present invention.

FIG. 3 illustrates an exemplary method of operation used in accordance with some embodiments of the present invention. The method illustrated in FIG. 3 is an example of how quick-logon may operate after installation and during use. The method begins with a request from the computing device to access the organization website. The organization server collects, analyzes and stores information about the computing device. Detecting that this computing device has been registered for quick-logon, the user is directed to the PIN input page. Assuming the user was the last registered user to use quick-logon on the computing device, the user inputs their PIN, which may be sent to the organization server. If the token generator was previously removed, the computing device downloads the token generator associated with the user from the organization server. Next, the token generator generates a one time code. The token generator is configured to generate different codes depending upon the time stamp. To generate such a one time code, the token generator requires the shared secret key that was encrypted and embedded on the computing device during the installation process, in addition to a time stamp. Various pieces of information or data may be used to decrypt the shared secret key. For example, in some embodiments, the user's PIN may be used to decrypt the shared secret key. Once the shared secret key is decrypted, the shared secret key and a time stamp are provided to the token generator. The one time code and time stamp are sent to the server. The server then validates the user using the various pieces of information. For example, the server may validate user's PIN, the device configuration, and the one-time code. The server may also perform checks to determine if the secure browser is enabled. In other embodiments, the system may require the secure browser to be enabled prior to allowing the user to logon. To validate the one time code, the server may match the one time code with the token generator serial number associated with the user. The one-time code, time stamp, and token generator serial number are sent from the server to the third party where third party validation of the one time code is requested. Using the time-stamp of the one-time code, and the token generator serial number, the third party server validates the one time code. If the server verifies the user to a certain level, the user is authenticated and granted access.

The quick-logon system may include additional verifying features that may be used in combination with other features. For example, in addition to the device fingerprint, secure browsing, token generator, a secure or obfuscated key that represents the computer and/or the user may be used.

Figure 4:
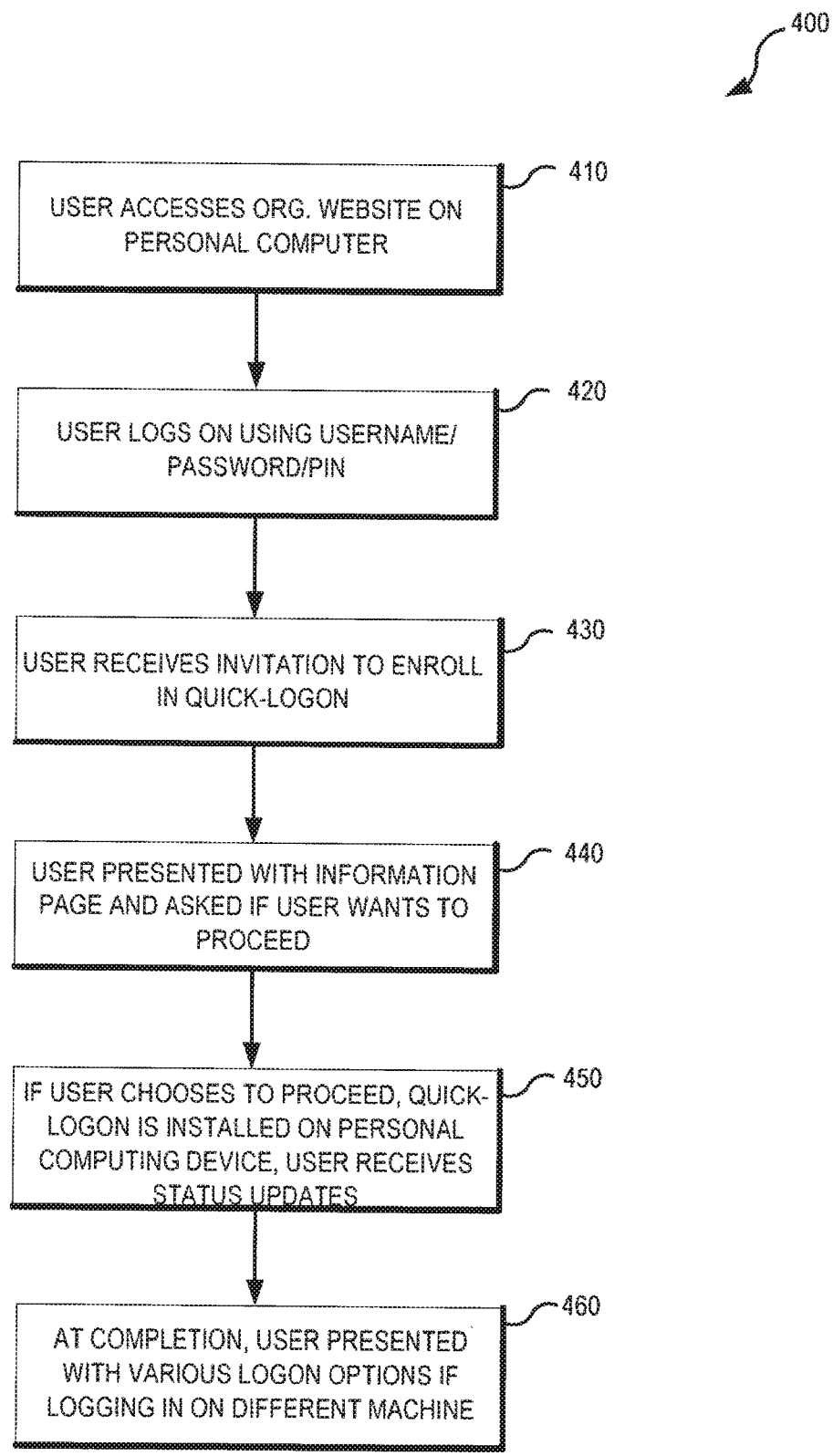
FIG. 4 is a flow chart illustrating a set of exemplary operations for registration in accordance with some embodiments of the present invention.

FIG. 4 is a flow chart illustrating a set of exemplary operations for registration in accordance with some embodiments of the present invention. In this embodiment, no user with the same profile has registered on this computing device. As described above, the registration process may be slightly different for a second user if a first user has registered on the computing device using the same profile. In block 410, a user accesses an organization website on a computing device. In block 420, the user logs on to an account at the organization by providing the verifying information such as a username, password, token, PIN, and the like. Once verified to a certain threshold, the user receives an invitation to register for quick-logon, as shown in block 430. In block 440, the user is presented with an information page and asked if the user would like to proceed with quick-logon installation. In block 450, if the user chooses to proceed, quick-logon is installed on the computing device. The user receives status updates as the installation occurs. In block 460, when the installation is complete, the user is presented with various logon options for when the user logs on using a different machine.

Figure 5:
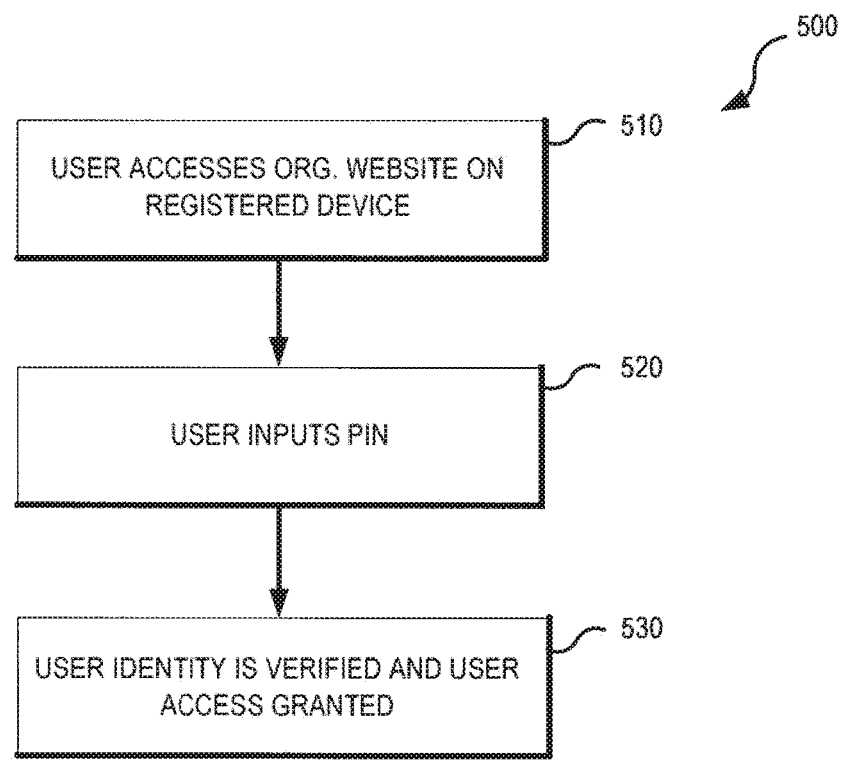
FIG. 5 is a flow chart illustrating a set of exemplary operations for using the quick-logon system in accordance with some embodiments of the present invention.

FIG. 5 is a flow chart illustrating a set of exemplary operations for using the quick-logon system in accordance with some embodiments of the present invention. In block 510, the user accesses the organization website using the registered computing device. Upon detecting that the computing device is registered, the user is directed to the PIN input page. In block 520, the user inputs a PIN. In block 530, after all the checks are performed in the background, the user is verified and granted access.

Figure 6:
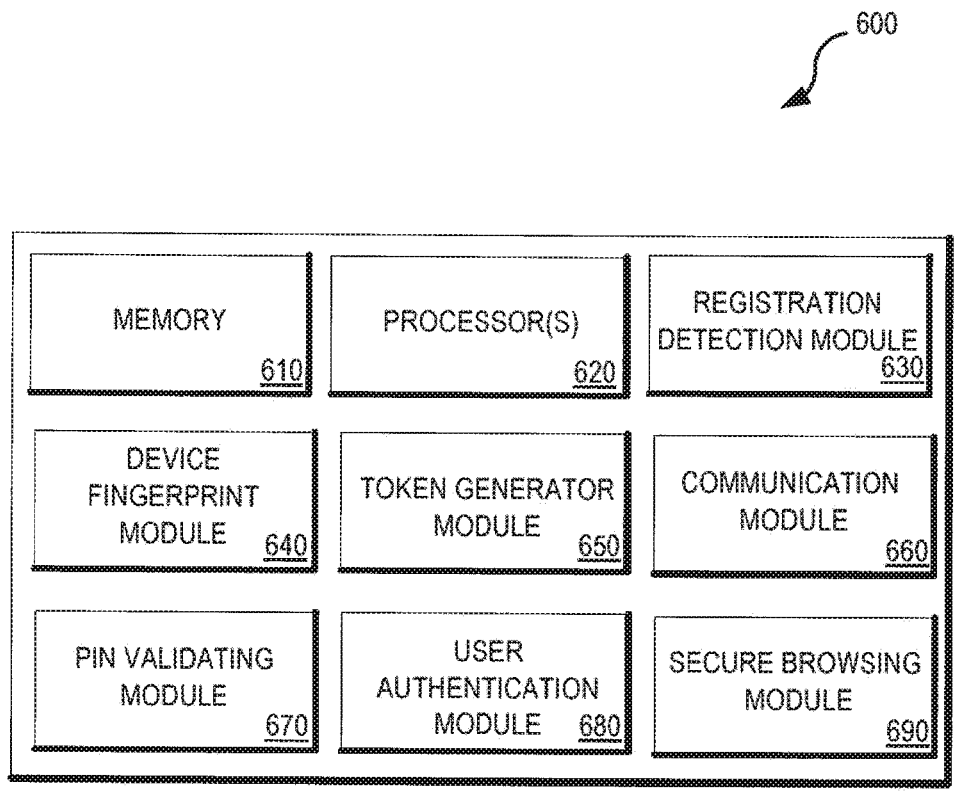
FIG. 6 is a block diagram illustrating exemplary components that can be included in a quick-logon system in accordance with various embodiments of the present invention.

FIG. 6 is a block diagram illustrating exemplary components that can be included in a quick-logon system in accordance with various embodiments of the present invention. According to the embodiments shown in FIG. 6, the quick-logon system 600 can include memory 610, one or more processors 620, registration detection module 630, device fingerprint module 640, token generator module 650, communication module 660, PIN validating module 670, user authentication module 680, and secure browsing module 690. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with user authentication module 680 and PIN validating module 670 can be incorporated into a single authentication module. As another example, in one embodiment, the token generator module 650 can be separated into a token generator module configured to generator tokens, a token generator installation module configured to install the token generator onto the client, and a token generator module configured to associate the token generator with the user.

Memory 610 can be any device, mechanism, or populated data structure used for storing information. In accordance with some embodiments of the present invention, memory 610 can encompass any type of, but is not limited to, volatile memory, nonvolatile memory and dynamic memory. For example, memory 610 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 610 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 610.

Memory 610 may be used to store instructions for running one or more applications or modules on processor(s) 620. For example, memory 610 could be used in one or more embodiments to house all or some of the instructions needed to execute the functionality of registration detection module 630, device fingerprint module 640, token generator module 650, communication module 660, PIN validating module 670, user authentication module 680, and secure browsing module 690.

Figure 7:
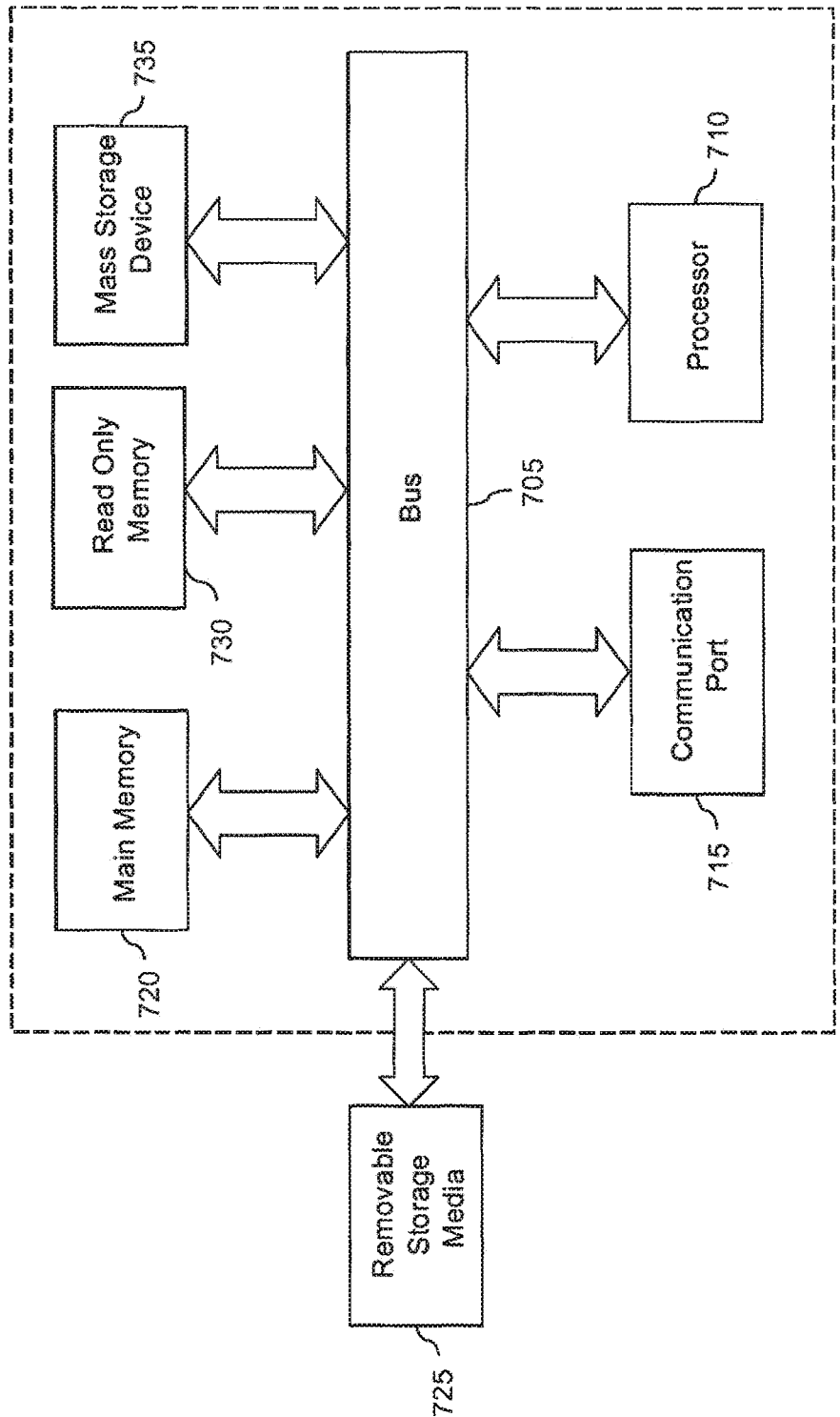
FIG. 7 illustrates an example of a computer system with which some embodiments of the present invention may be utilized.

FIG. 7 illustrates an example of a computer system with which some embodiments of the present invention may be utilized.

Exemplary Computer System Overview

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola @lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage and communication blocks. Bus 705 can be a computing device/computing device X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Figure 8:
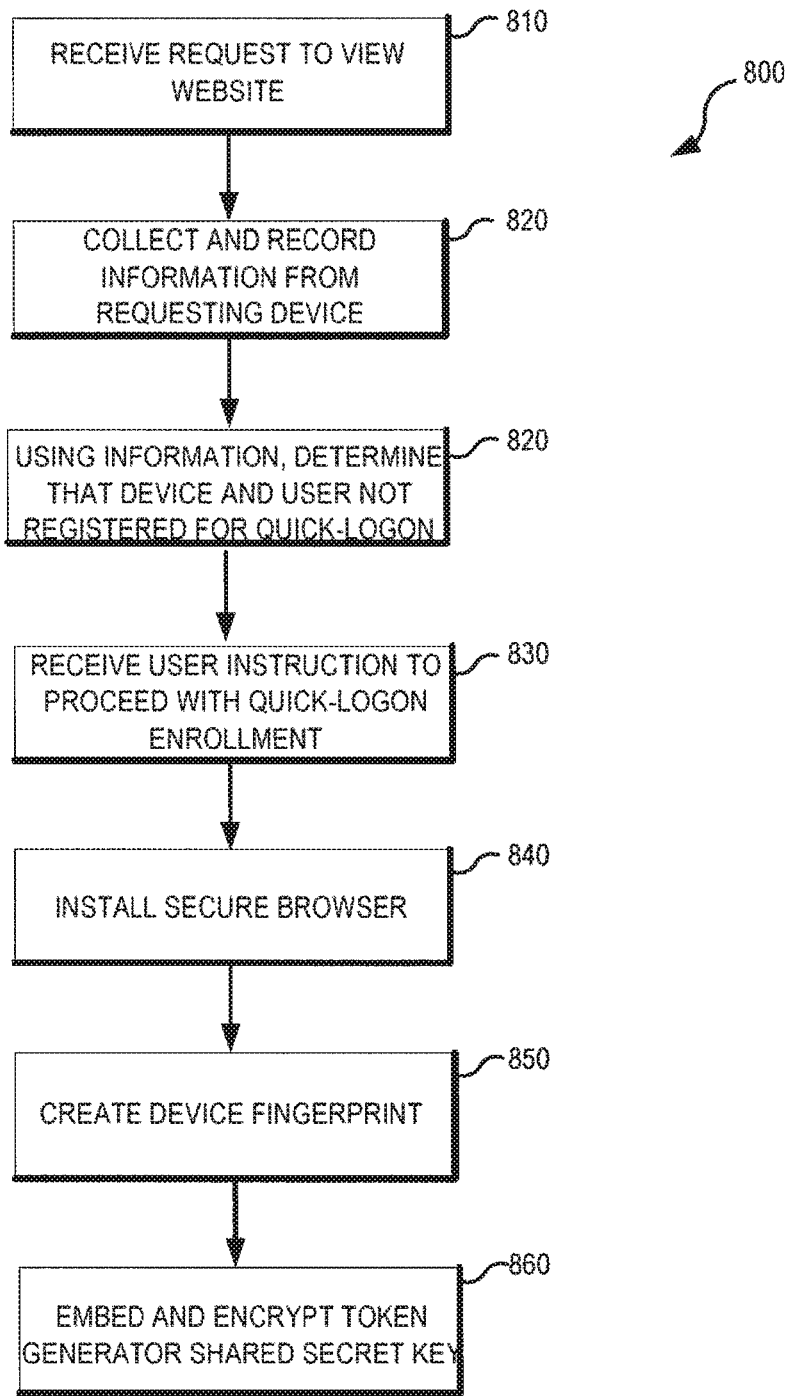
FIG. 8 is a flow chart illustrating a set of exemplary operations for registration in accordance with some embodiments of the present invention.

FIG. 8 is a flow chart illustrating a set of exemplary operations for registration in accordance with some embodiments of the present invention.

Figure 9:
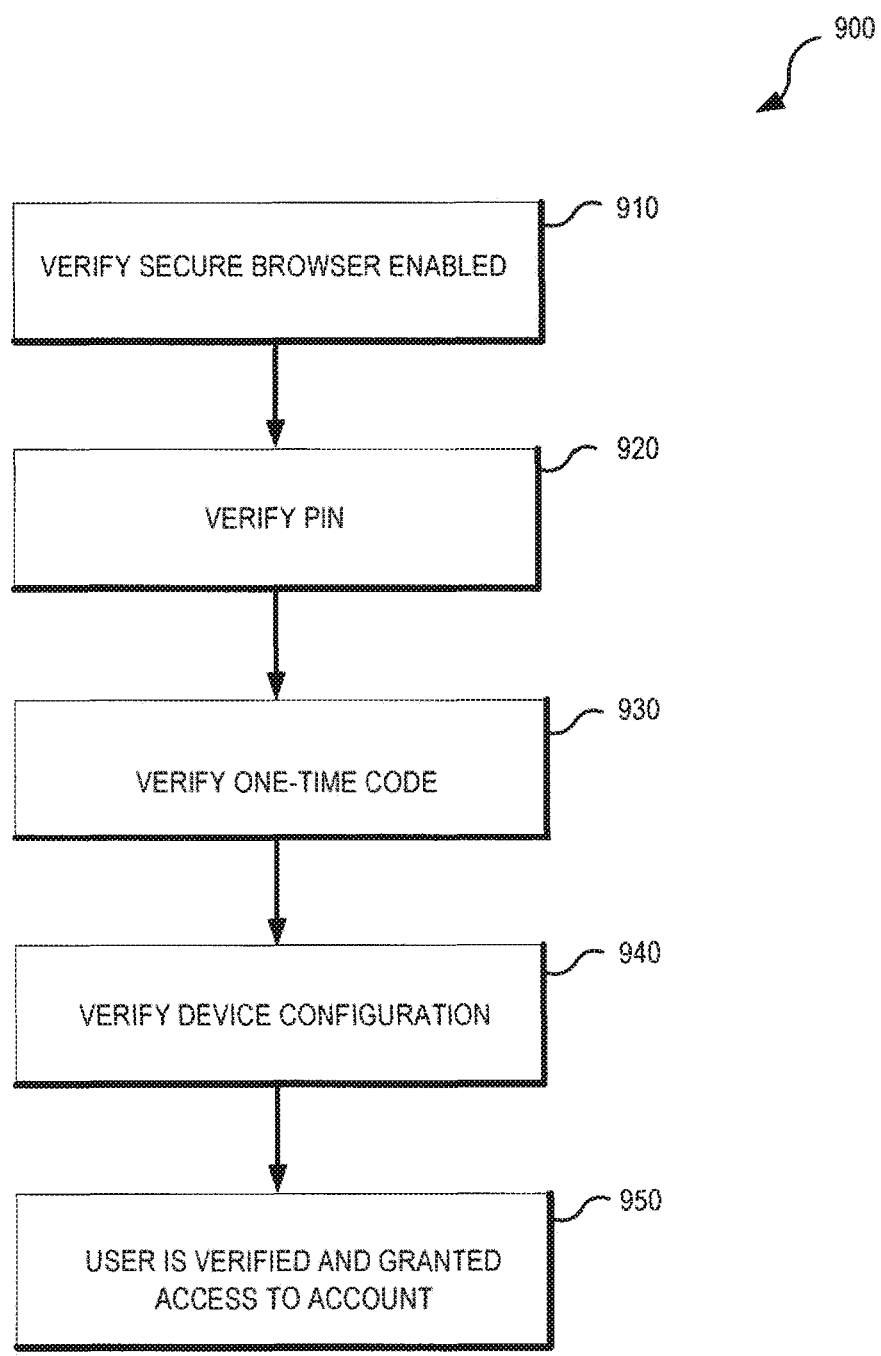
FIG. 9 is a flow chart illustrating a set of exemplary operations for verifying a user in accordance with some embodiments of the present invention.

FIG. 9 is a flow chart illustrating a set of exemplary operations for verifying a user in accordance with some embodiments of the present invention.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modem computer networks. Importantly, while these embodiments describe various aspects of the invention in relation to modem computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods and arrangements for systems and methods to verify a user on a computing device using two-factor authentication. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A computer-implemented method comprising:
    installing an authentication system on a computing device associated with a user by:
        collecting information to identify the computing device,
        installing a token generator on the computing device,
        associating a key with the token generator,
        encrypting the key and embedding the encrypted key on the computing device, and
        associating the token generator with an identification number associated with the user;
    receiving a logon request at the computing device from the user, wherein the logon request comprises identifying information and a one-time code generated by the token generator; and
    in response to verifying the one-time code with a code associated with the token generator, the user to operate the computing device without further interaction with the user.

2. The computer-implemented method of claim 1, wherein installing the authentication system further comprises: installing a secure browsing solution on the computing device and generating a device fingerprint of the computing device.

3. The computer-implemented method of claim 1, wherein the token generator is removed after the user terminates a session.

4. The computer-implemented method of claim 1, further comprising:
prior to installing the authentication system on the computing device:
verifying, using a first method of authentication, an identity of the user,
requesting permission to install the authentication system onto the computing device, wherein the authentication system authenticates the user using a second method of authentication.

5. The computer-implemented method of claim 1, wherein the identifying information comprises biometric data.

6. The computer-implemented method of claim 1, wherein the method further comprises installing more than one token generator on the computing device, wherein each token generator is associated with a different user.

7. The computer-implemented method of claim 1, wherein the method further comprises requesting irrelevant data to be included with the one-time code or the identifying information.

8. A non-transitory computer-readable storage medium coupled to one or more processors and having instructions stored thereon which, when executed by the one or more processors, cause the one or more processors to perform operations for authenticating a user session on a system, the operations comprising:
installing an authentication system on a computing device associated with a user by:
collecting information to identify the computing device,
installing a token generator on the computing device,
associating a key with the token generator,
encrypting the key and embedding the encrypted key on the computing device, and
associating the token generator with an identification number associated with the user;
receiving a logon request at the computing device from the user, wherein the logon request comprises identifying information and a one-time code generated by the token generator; and
in response to verifying the one-time code with a code associated with the token generator, the user to operate the computing device without further interaction with the user.

9. The non-transitory computer-readable storage medium of claim 8, wherein installing the authentication system further comprises: installing a secure browsing solution on the computing device and generating a device fingerprint of the computing device.

10. The non-transitory computer-readable storage medium of claim 8, wherein the token generator is removed after the user terminates a session.

11. The non-transitory computer-readable storage medium of claim 8, wherein the operations further comprise:
prior to installing the authentication system on the computing device:
verifying, using a first method of authentication, an identity of the user,
requesting permission to install the authentication system onto the computing device, wherein the authentication system authenticates the user using a second method of authentication.

12. The non-transitory computer-readable storage medium of claim 8, wherein the identifying information comprises biometric data.

13. The non-transitory computer-readable storage medium of claim 8, wherein the operations further comprise installing more than one token generator on the computing device, wherein each token generator is associated with a different user.

14. The non-transitory computer-readable storage medium of claim 8, wherein the operations further comprise requesting irrelevant data to be included with the one-time code or the identifying information.

15. A system, comprising:
one or more processors; and
a computer-readable storage device coupled to the one or more processors and having instructions stored thereon which, when executed by the one or more processors, cause the one or more processors to perform operations comprising:
installing an authentication system on a computing device associated with a user by:
collecting information to identify the computing device,
installing a token generator on the computing device,
associating a key with the token generator,
encrypting the key and embedding the encrypted key on the computing device, and
associating the token generator with an identification number associated with the user;
receiving a logon request at the computing device from the user, wherein the logon request comprises identifying information and a one-time code generated by the token generator; and
in response to verifying the one-time code with a code associated with the token generator, the user to operate the computing device without further interaction with the user.

16. The system of claim 15, wherein installing the authentication system further comprises: installing a secure browsing solution on the computing device and generating a device fingerprint of the computing device.

17. The system of claim 15, wherein the token generator is removed after the user terminates a session.

18. The system of claim 15, wherein the operations further comprise:
prior to installing the authentication system on the computing device:
verifying, using a first method of authentication, an identity of the user,
requesting permission to install the authentication system onto the computing device, wherein the authentication system authenticates the user using a second method of authentication.

19. The system of claim 15, wherein the operations further comprise installing more than one token generator on the computing device, wherein each token generator is associated with a different user.

20. The system of claim 15, wherein the operations further comprise requesting irrelevant data to be included with the one-time code or the identifying information.

\* \* \* \* \*